Sept. 24, 1968  E. J. JOHNSTON  3,402,542
RAKE TOOTH METHOD OF MAKING SAME
Filed Sept. 26, 1966
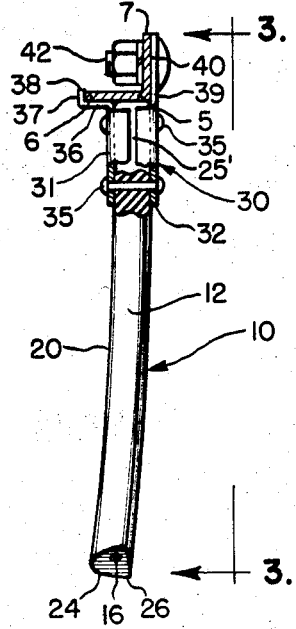
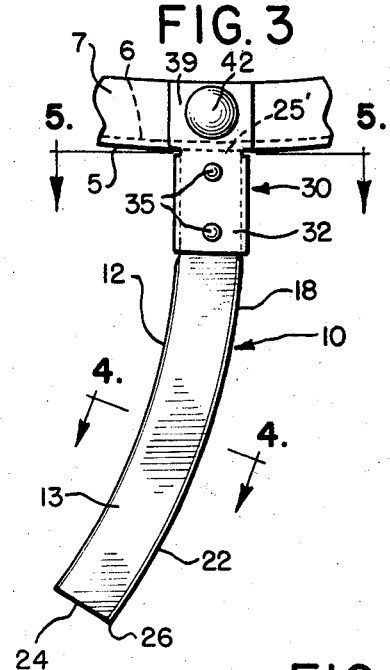
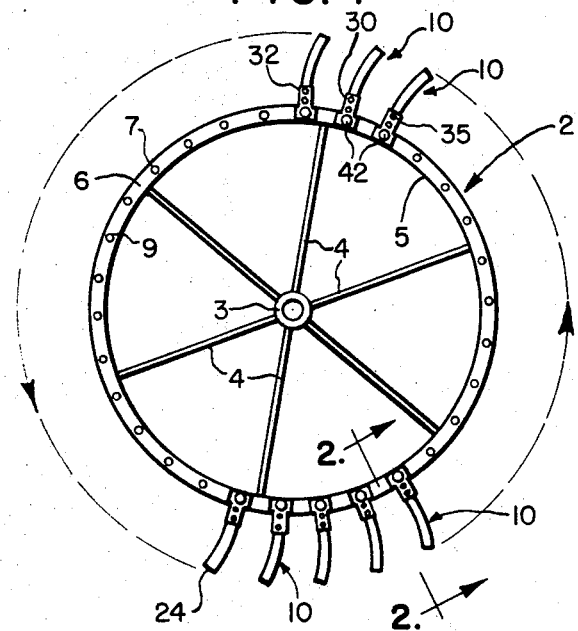
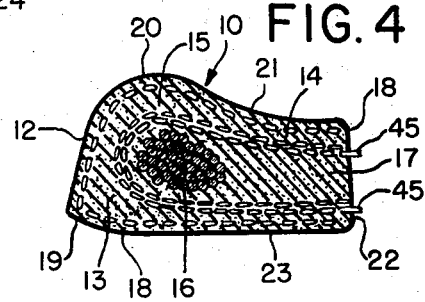
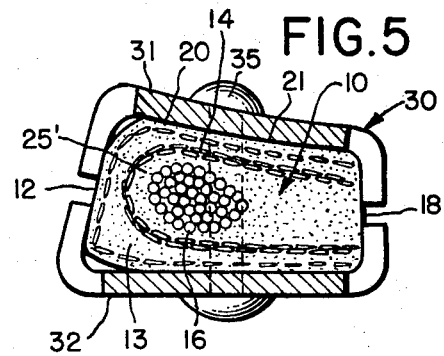
Inventor
Edward A. Johnston
John J. Kowalik
Attorney United States Patent Office 3,402,542
Patented Sept. 24, 1968

3,402,542
RAKE TOOTH METHOD OF MAKING SAME
Edward J. Johnston, La Grange, Ill., assignor to International Harvester Company, Chicago, Ill., a corporation of Delaware
Filed Sept. 26, 1966, Ser. No. 582,127
10 Claims. (Cl. 56—400)

ABSTRACT OF THE DISCLOSURE

A rake tooth made from a tire bead having a thick concave trailing portion and a thinner convex leading portion.

---

This invention relates to agricultural apparatus and more specifically to a tooth structure for a side delivery rake and more specifically involves the method of making a rake tooth from a bead portion of a pneumatic tire and to the tooth structure itself.

Various uses have been developed for discarded tires. However, the bead portion has always posed a problem in that no practical use could be found. These portions of the tire were either burned or cut up and thrown away.

A general object of this invention is to provide a novel rake tooth structure which is of durable and efficient form made from the bead of a tire carcass.

A more specific object of the invention is to provide a rake tooth structure for a side delivery rake of a type commonly known as a "wheel" rake, the rake tooth being formed to provide a curved convex leading edge and a concave trailing portion for effective raking performance and disengagement from the hay as it is discharged from the rake wheel.

A further object of the invention is to provide a novel method for making rake teeth from beads of a tire carcass comprising cutting the bead portion from the sidewall of a tire to provide a continuous circular outer edge portion and then cutting the bead into discrete lengths along radial planes.

A further object of the invention is to provide a novel rake tooth comprising an outer edge which is substantially radial to the axis of curvature to provide a sharp point for digging into the material which is conducive to an effective raking action and shedding of the material as the wheel reaches the discharge zone.

A still further object of the invention is to provide a novel rake tooth construction which utilizes fiber content of the tire carcass that is a rubber and fiber impregnated material in order to effectively sweep the hay in raking it into a windrow.

A still further object of the invention is to provide a novel rake tooth wherein the steel wire reinforcement of a tire bead is utilized to provide a backbone for the tooth as to afford sufficient rigidity as well as flexibility to insure proper raking action and also proper relief of the tooth when meeting an obstruction.

A further object of the invention is to provide a novel rake tooth of the type described wherein the attachment to the rake wheel is of simple but effective construction.

These and other objects and advantages inherent in and arising out of the invention will become more readily apparent from the specification and drawings, wherein:

FIGURE 1 is a side elevational view of a rake wheel incorporating the invention, only several of the rake teeth being shown;

FIGURE 2 is an enlarged sectional view taken substantially on line 2—2 of FIGURE 1;

FIGURE 3 is a front elevational view of the rake tooth taken substantially on line 3—3 of FIGURE 2;

FIGURE 4 is an enlarged cross-sectional view taken substantially on line 4—4 of FIGURE 3; and FIGURE 5 is a further cross-sectional view taken substantially on line 5—5 of FIGURE 3.

Describing the invention in detail, the rake wheel generally designated 2 comprises a central hub which is adapted to be mounted on the spindle for rotation about a substantially horizontal axis as is well known to those skilled in the art, the wheel being disposed at an angle to the direction traverse of the rake.

The hub 3 of the wheel is connected to a series of spokes 4 which in turn is connected to a rim 5, said rim 5 having an annular portion 6 and a radial portion 7 which are arranged in L section. The portion 7 preferably extends radially inwardly of portion 6 and is provided with a series of holes 9 for attachment thereto as hereinafter stated of rake teeth 10.

Each rake tooth 10 is made from a tire carcass, and more specifically from the bead portion of the tire carcass. As is known the inner periphery of the tire carcass is circular and provides the inner edge 12 which form the rear or trailing edge 12 of the tooth 10 on the trailing portion 13 thereof. The tooth is of combined fiber impregnated elastomer material which includes the fiber threads 14 in the elastomer material 15 and a bundle of wire 16 which is used as a reinforcement to the bead portion of the tire. It will be seen that the trailing or base portion 13 of the tooth is thicker than the leading portion 17 and that the base portion has a generally flat forward side 18 which merges along a rearwardly curved face 19 with the generally flat rear edge portion 12. The rear side 20 of the rear or trailing portion is transversely convexed or curved and merges into a reversely concaved or curved rear side 21. Surface 21 is concaved forwardly as opposed to the convex surface portion 20 which is bowed-out rearwardly. The surface 21 merges into the leading edge surface 22 which extends substantially normal to the surfaces 21, 23 the latter surface 23 being on the forward side of the leading or forward portion of the rake tooth.

The leading surface 22 is curved generally concentric with the surface 12 and the outer and inner ends of the tooth have generally flat surfaces 24, 25 which are generally radial. The surface 24 together with the surface 22 develop a pickup point or apex or outer end portion 26 the lower end of the leading edge surface 22 so that the tooth will dig into the stubble of the material and thus effectively rake the material.

It should be realized that the bundle of wires 16 not only strengthen the tooth against endwise impact but also serve to stabilize transverse deflection of the tooth and provide an adequate backbone for the tooth structure and give it the necessary flexibility.

The inner or root end portion 25' of the tooth is secured to the rim of the wheel by a securing means generally designated 30 which comprises a pair of brackets 31 and 32 in the nature of clamps which embrace the tooth front and rear sides therebetween, said portions 31 and 32 being substantially U-shaped in cross-section and embracing the front or leading and trailing edges of the tooth and being secured to the tooth by means of rivets or bolts 35, 35 which extend through the front and rear brackets and through apertures in the body portion of the tooth. The clamp portion 31 is provided with a lug 36 which lays against the exterior of rim 6 and at its free edge is provided with a holding lub 37 which extends substantially radially of the wheel and engages with the back edge 38 of the rim 6.

The bracket 32 is provided with a lug 39 which extends along the forward side 40 of the flange portion 7 and is connected thereto as by nut and bolt assembly 42 through openings 9.

Thus it will be evident that a novel tooth has been provided which has curved contour, the tooth lying within the plane of the wheel and providing a convex leading crop engaging surface area and a concave trailing surface edge. Furthermore leading portion is unsupported and is not as rigid as the trailing portion which incorporates the bundle of wires and therefore should the tooth meet an obstruction the front edge portion is adapted to deflect not only to the rear but also circumferentially of the wheel. However, should the tooth strike a large obstruction the entire tooth may bend and deflect about its connection with respect to the wheel.

It will be further observed that the tire carcass material or fiber such as cotton or rayon thread or even nylon, projects as at 45 the leading side of the rake tooth and provides tentacles which effectively carry the crops along whereas the rubberized front and rear and trailing edge surfaces tend to readily shed the crop material particularly when these surface areas are wet when operating in the crops. The areas 45, however, are not of such aggressive character as to carry the crops over the wheel.

A novel tooth construction has been provided which not only because of its material composition obtains good operating characteristics, but the shape as well obtains good raking as well as stability.

I claim:
1. A normally arcuate raking tine comprising an element made from the bead portion of a pneumatic tire carcass and having a leading edge portion and a normally concave trailing edge portion when disengaged from the crops, and said trailing edge portion being relatively wide and rigid and having a narrower flexible leading edge portion.

2. The invention according to claim 1 and said trailing edge portion of said element being wire-reinforced.

3. The invention according to claim 1 and said element comprising a fabric reinforced elastomeric structure.

4. The invention according to claim 1 and said trailing edge portion being transversely thick and having lateral sides converging toward a leading edge portion.

5. The invention according to claim 1 and said element having a root end portion and an outer end portion, and securing means connected to said root end portion.

6. The invention according to claim 1 and said trailing edge portion being generally ovate in cross-section.

7. The invention according to claim 1 and said trailing edge portion having a substantially flat crop engaging side generally coplanar with the related side of the leading edge portion and having a rear side bulged outwardly from the plane of the adjacent side of the leading edge portion and providing a relatively stiff backbone for said tooth.

8. The invention according to claim 1 and said leading portion being convex.

9. The invention according to claim 7 and said leading portion having a leading edge disposed substantially normal to said front and rear sides of said leading portion.

10. The invention according to claim 1 and said tooth being a segment of a circle and having a generally radial outer end surface, and the leading edge portion being a segment of a circle and forming a sharp pick-up point with the end surface.

References Cited
UNITED STATES PATENTS 2,862,717 12/1958 Ronning _____ 56—29 X
2,964,896 12/1960 Finocchiaro.
3,218,788 11/1965 Hubbard _____ 56—377 X ABRAHAM G. STONE, *Primary Examiner.*

J. W. PETERSON, *Assistant Examiner.*